US010873697B1

(12) United States Patent
Jain et al.

(10) Patent No.: US 10,873,697 B1
(45) Date of Patent: Dec. 22, 2020

(54) IDENTIFYING REGIONS OF INTEREST IN CAPTURED VIDEO DATA OBJECTS BY DETECTING MOVEMENT WITHIN HIGHER RESOLUTION FRAMES OF THE REGIONS

(71) Applicant: Facebook, Inc., Menlo Park, CA (US)

(72) Inventors: Anshul Kumar Jain, Mountain View, CA (US); Abhinav Garlapati, Mountain View, CA (US); Eric W. Hwang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/564,447

(22) Filed: Sep. 9, 2019

Related U.S. Application Data

(60) Provisional application No. 62/826,385, filed on Mar. 29, 2019.

(51) Int. Cl.
*H04N 5/232* (2006.01)
*G06T 7/246* (2017.01)
*G06K 9/00* (2006.01)
*G06K 9/32* (2006.01)

(52) U.S. Cl.
CPC ..... *H04N 5/23218* (2018.08); *G06K 9/00718* (2013.01); *G06K 9/3233* (2013.01); *G06T 7/248* (2017.01); *G06T 2207/10016* (2013.01)

(58) Field of Classification Search
CPC ........... H04N 5/23218; G06K 9/00718; G06K 9/3233; G06T 7/248; G06T 2207/10016
See application file for complete search history.

(56) References Cited

U.S. PATENT DOCUMENTS

| | | | |
|---|---|---|---|
| 8,970,654 B1* | 3/2015 | Johnson | G06K 9/00711 348/14.07 |
| 2009/0085740 A1* | 4/2009 | Klein | H04N 21/2662 340/540 |
| 2009/0303342 A1* | 12/2009 | Corcoran | G06K 9/00261 348/222.1 |

* cited by examiner

*Primary Examiner* — Mekonnen D Dagnew
(74) *Attorney, Agent, or Firm* — Fenwick & West LLP

(57) ABSTRACT

Multiple users communicate over a network via client devices that include one or more cameras and a display to enable video messaging. At least one of the client devices modifies regions of video data captured by the client device's camera to more prominently identify the people within the video data. To identify a person, the client device disambiguates between actual people and static objects that may appear like people. The client device uses pose models to identify bounding boxes and applies a motion model to determine if a bounding box may include a person based on an amount of movement within the bounding box. If a threshold amount of movement is detected in a bounding box, the client device obtains a higher resolution portion of the scene including the bounding box and classifies whether the bounding box contains a person based on movement within the higher resolution video.

21 Claims, 4 Drawing Sheets

IDENTIFYING REGIONS OF INTEREST IN CAPTURED VIDEO DATA OBJECTS BY DETECTING MOVEMENT WITHIN HIGHER RESOLUTION FRAMES OF THE REGIONS

CROSS-REFERENCE TO RELATED APPLICATIONS

This application claims the benefit of U.S. Provisional Application No. 62/826,385 filed Mar. 29, 2019, which is incorporated by reference in its entirety.

BACKGROUND

This disclosure relates generally to capturing video data, and more specifically to identifying regions of frames of the captured video that include moving objects.

Increasingly, client devices, online systems, and networks allow users to exchange larger amounts of content with each other. For example, an online system allows its users to exchange video data captured by different users via client devices associated with the user. In a specific example, an online system may establish video messaging between a user and an additional user, allowing the users to exchange video data captured by their respective client devices in real-time or in near real-time.

However, when providing video data, conventional client devices require a user to manually configure video capture. For example, a user of a client device provides inputs to the client device to identify a focal point of the client device's image capture device, to specify a magnification of the client device's image capture device, or other parameters of the client device's image capture device. In addition to providing initial inputs identifying parameters of the client device's image capture device, conventional client devices require the user to manually reposition a client device's image capture device to different portions of a local area within a field of view of the client device's image capture device. Hence, a user manually selects and maintains content captured by a client device's image capture device that is communicated to another client device. While this dependence on user-provided input affords the user significant control over video data captured by a client device, conventional client devices do not allow a user to readily perform other while capturing video data for messaging via a client device, as the conventional client devices are unable to adjust video data capture as conditions change without receiving express inputs from the user.

SUMMARY

Various client devices associated with users of an online system include one or more image capture devices. An image capture device included in a client device is configured to capture video data of a local area surrounding the client device, for example, during a video call or when the user turns on the video capturing feature. Additionally, the client device includes a controller coupled to the one or more image capture devices. The controller applies one or more models to video data captured by an image capture device and modifies video data captured by the image capture device or parameters of the image capture device based on application of the one or more models. This allows the controller to modify captured video data based on characteristics or content of video data previously captured by thee image capture device.

The controller maintains and enforces one or more privacy settings for users and other people captured in the video data or other data in various embodiments. For example, the controller may have a default privacy setting preventing the controller from identifying a user until the user manually alters the privacy setting to allow the controller to identify the user. The default privacy setting may also extend to any captured video data, audio data, image data, or other data so that a user may select whether to allow the image capture device to identify any user in the data. Additionally, the privacy setting also regulates transmission of information from the client device to another entity (e.g., another client device or a third party system). The various privacy settings allow a user to control the identification of the user and the storage and sharing of any user-related data. The privacy settings also may be enforced individually with respect to each individual. For example, a user opting in a user identification feature may not change the default privacy settings for other users that may be incidentally captured in the local area surrounding the client device.

In various embodiments, based on users' privacy selections to enable the client device to identify the users included in video data captured by the one or more image capture devices, the controller applies one or more machine learned models to video data captured by an image capture device to locate the users included in the captured video data. The models applied by the controller identify regions that include people within different frames of the captured video data. Models applied by the controller to captured video data may perform facial tracking (in two-dimensions or in three-dimensions), two-dimensional pose tracking, three-dimensional pose tracking, or any other suitable method to identify portions of a person's face or portions of the person's body. In various embodiments, the controller modifies captured video data or parameters of the image capture device to more prominently present located users. For example, the controller crops the captured video data to remove portions of the video data that do not include at least one person. As another example, the controller modifies a focal point of the image capture device to a face of a person and increases a magnification (i.e., a zoom) of the image capture device. In various embodiments, users have the options to prevent any recordings (video, voice, etc.) from being stored locally in the client device and/or on the cloud and also to delete any recordings, if saved.

When modifying video data to account for users or people within the video data, the controller differentiates between a foreground and a background of the video data. The background of frames of the video data include static objects, while the foreground includes moving objects, such as people. While certain models differentiating a foreground portion of captured video data from a background portion of the video data use differences between consecutive frames of video data, these models may identify certain regions of the captured video data as part of the background portion of the image because the certain regions have less than a threshold amount of differences in consecutive frames of the captured video data. However, even though there is less than a threshold amount of differences between a region of captured video data in consecutive frames, the region may include a person or other object of interest to the user. For example, a region of captured video data including a stationary person may have less than a threshold amount of change in pixels within the region in consecutive frames of the captured video data from small movements of the person over time (e.g., breathing, blinking), so identifying the region as a background region would prevent subsequent identification or tracking of the person. As another example, movement in different regions of the captured video is attenuated for regions corresponding to objects that are greater distances from the client device, particularly when the image capture device has a relatively wide field of view. Because objects at greater distances from the client device occupy fewer pixels in the captured video data, movement by the objects at greater distances may result in less than a threshold amount of change in pixels within the regions corresponding to the objects that are greater distances from the client device, causing the regions to be classified as background regions. Such classification as a background region would prevent subsequent identification or tracking of people within the regions corresponding to objects that are greater distances from the client device.

To more accurately identify regions of captured video data including people or other particular objects, the client device captures video data and the controller of the client device generates a model identifying a foreground portion of frames of the video data and a background portion of frames of the video data. In various embodiments, the model identifies the background portion of frames of the video data with the model, so regions of the video data that are not identified as the background portion are the foreground portion of the video data. The controller may generate the model based on changes in different regions of the captured video data over time, so regions of the video data having less than a threshold amount of change over at least a threshold number of consecutive pixels are identified as background portions of the captured video data.

In addition to generating the model identifying the background portion of the captured video data, the controller applies one or more additional models to the captured video data to identify one or more regions within frames of video data that include people (or other objects). For example, the controller performs facial tracking (in two-dimensions or in three-dimensions), two-dimensional pose tracking, three-dimensional pose tracking, or any other suitable method to identify portions of a person's face or portions of the person's body. The controller identifies regions of the captured video data including people (or other objects) and stores metadata in association with the video data specifying locations within the captured video data of the identified regions. For example, the controller stores coordinates of frames of the video data specifying a bounding box that include a person (or another object}, so the bounding box specifies the region of the captured video data including the person (or the other object).

From the model identifying the background portion and the foreground portion of the captured video data, the controller identifies candidate regions of frames of the video data as regions of frames of the video data identified as including a person (or another object) that were potentially incorrectly identified as not including a person (or another object) or that were potentially incorrectly identified as including a person. In various embodiments, the controller generates scores for each of multiple regions of frames of the captured video data. For example, a score for a region of a frame identified of the captured video data identified as including a person (or another object) is a ratio of a number of pixels in the bounding box identified as foreground portions of the video data to a total number of pixels in a bounding box of a region identified as including a person. Regions having at least a threshold score are identified as candidate regions, which the controller further evaluates to determine if the regions include a person.

The controller ranks the candidate regions in various embodiments based on their scores, so candidate regions having higher scores have higher positions in the ranking. In some embodiments, the controller ranks the candidate regions based on one or more criteria. For example, the controller accounts for an amount of time before the generated model would identify the different candidate regions as background portions of the captured video data. In the preceding examples, candidate regions that would be identified as background portions of the captured video data in shorter amounts of time have higher positions in the ranking than candidate regions that would be identified as background portions of the captured video data. In another example, the controller adjusts scores for different candidate regions based on amounts of time before the generated model would identify corresponding candidate regions as background portions of the video data to increase scores of candidate regions that would be classified as background portions of the captured video data in shorter amounts of time. In other embodiments, the controller adjusts scores for different candidate regions based on whether a pose or a face was identified within the candidate region, increasing scores of candidate regions in which a pose or a face was identified, and ranks the candidate regions based on the adjusted scores. In other embodiments, the controller adjusts scores for candidate regions based on combinations of whether poses or faces were identified in candidate regions, amounts of time until candidate regions would be identified as background portions of the captured video data, as well as any other suitable information to rank the candidate regions.

Based on the ranking, the controller obtains higher resolution frames of one or more candidate regions from an image capture device. For example, the controller selects candidate regions having at least a threshold position in the ranking and identifies coordinates within the frames of the captured video to the image capture device, which increases a resolution at which frames of video data of a selected candidate region are captured. The image capture device provides the higher resolution image of the one or more candidate regions to the controller through a separate channel than the image capture device uses to provide other captured frames of video data to the controller. This allows the controller to obtain higher resolution frames of the candidate regions from the image capture device, while also capturing lower resolution frames of a wider area that are provided to the controller for communication to a display device or to another client device. Ranking the candidate regions allows the controller to prioritize different candidate regions for which higher resolution frames are obtained, allowing the controller to more efficiently allocate computational resources for analysis of the higher resolution frames, as further described below. This allows the controller to optimize limited computational resources by allocating the computational resources to a limited number of candidate regions selected from the ranking.

The controller applies one or more models to identify motion in the higher resolution frames of a candidate region of the captured video data and determines whether the candidate region includes a person (or another object) based on the amount of motion identified in the higher resolution frames of the candidate region. In response to identifying at least a threshold amount of motion in the higher resolution frames of the candidate region, the controller identifies the candidate region as including a person (or another object). However, in response to identifying less than the threshold amount of motion in the higher resolution frames of the candidate region, the controller determines the candidate region does not include a person (or another object).

Hence, the controller uses a two-stage process that initially identifies candidate regions to further evaluate for including a person from captured video data of a scene and subsequently obtains higher resolution frames of different candidate regions. The higher resolution frames of a candidate region are subsequently used to determine whether the candidate region includes a person (or another object) or is a background portion of the captured video data. This allows the controller to be more sensitive to smaller amounts of motion in a candidate region of the captured video data from the higher resolution frames of the candidate region, allowing more accurate differentiation of people (or other objects) from background portions of the captured video data. As a result, this two-stage process reduces an amount of time for the controller to generate the model identifying the background portion of the captured video data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
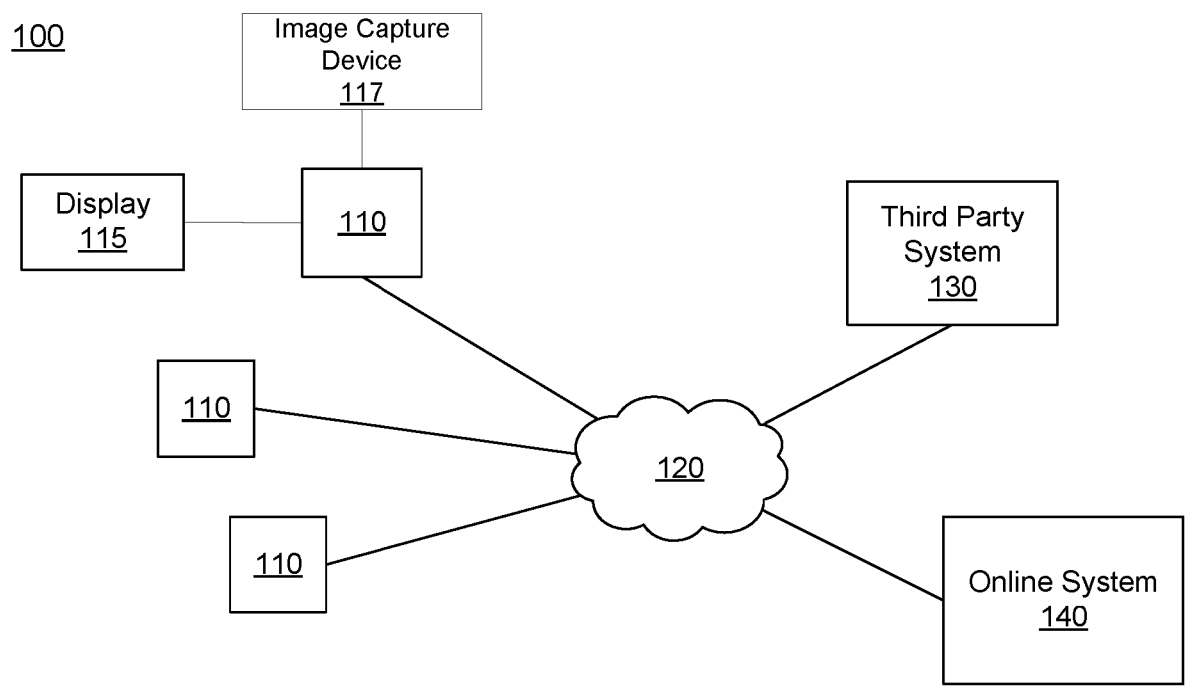
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
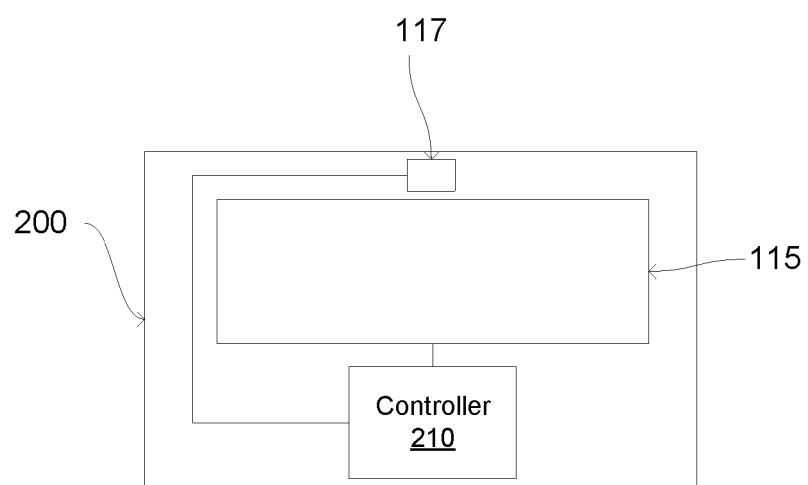
FIG. 2 is a block diagram of a client device, in accordance with an embodiment.

FIG. 2 is a block diagram of an embodiment of a client device 117. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117. In various embodiments, users have the options to prevent any recordings (video, voice, etc.) from being stored locally in the client device and/or on the cloud and also to delete any recordings, if saved.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117. In various embodiments, the one or more models are applied to video data, audio data, image data, or any combination of data captured by the image capture device 117 or any other devices included in or coupled to the client device 110. As further described below in conjunction with FIG. 4, models applied to captured video data by the controller 210 apply one or more rules to characteristics of captured video data to identify objects, people, movement, or any other suitable content of the captured video data. Based on application of the models and subject to one or more privacy settings, the controller 210 modifies the captured video data or modifies one or more parameters of the image capture device 117 so subsequently captured video data is modified. For example, users may authorize the controller 210 to apply models that locate the users in captured video data based on characteristics of the captured video data and modifies the captured video data to more prominently include the located users or modifies one or more parameters (e.g., focal length, magnification or zoom, cropping of captured video data) of the image capture device 117 so additional video data more prominently includes the located users. The additional video data more prominently includes a located person by presenting the located person with at least a threshold set of dimensions (e.g., with at least a threshold height or a threshold width), presents the located person in at least a threshold amount of a field of view of the image capture device 117 or in at least a threshold amount of a frame of the captured video data, or presents the located person in one or more specific locations within the captured video data. However, models applied by the controller 210 may identify any suitable components of video data captured by the image capture device 117 and modify parameters of the image capture device 117 or modify captured video data accordingly.

In various embodiments, the client device 110 includes one or more audio capture devices, such as microphones. For example, the client device 110 includes an array of microphones configured for beamforming in two or three dimensions. The audio capture devices capture audio signals from different regions within a local area surrounding the client device 110. In various embodiments, the one or more audio capture devices are coupled to the controller 210, which maintains information identifying different regions of the local area surrounding the client device 110; for example, the controller 210 identifies 24 fifteen degree regions of the local area surrounding the client device 110 originating from a point within the client device 110, identifying regions of a 360 degree local area surrounding the client device 110.

The one or more audio capture devices are coupled to the controller 210. Subject to user selected privacy settings, the controller 210 applies one or more models, such as machine learned models or other sound recognition models, to audio data captured from a region of the local area surrounding the client device 110. The controller 210 includes information identifying users or objects (e.g., a television, a mobile device), and application of the one or more models to audio captured from a region of the local area surrounding the client device 110 determines whether the captured audio data includes audio data from a user or an object identified by the controller 210 or ambient noise. In some embodiments, the one or more models applied by the controller 210 determine a particular user or a particular object identified by the controller 210 from which the one or more audio capture devices captured audio in the region. In other embodiments, the client device 110 communicates audio data captured by one or more audio devices to the online system 140, which applies the one or more models to determine whether the audio data includes audio data captured from an identified object or user or to determine a particular identified user or object from which audio data was captured. The online system 140 provides the client device 110 with an indication of whether the captured audio data includes audio data captured from an identified object or user or provides information specifying a particular identified object or user from which the audio data was captured. The controller 210 or the online system 140 similarly determines whether audio captured from other regions surrounding the local area of the client device 110. Based on determinations of identified objects or users from which audio data in different regions was captured, the controller 210 modifies positioning of one or more audio devices to improve quality of audio captured from one or more regions. For example, the controller 210 repositions one or more audio capture devices to improve quality of audio captured from a region surrounding the local area from which audio data was captured from a specific user or from a specified object. Similarly, the controller 210 may reposition or otherwise modify one or more parameters of the image capture device 117 based on regions of the local area surrounding the client device 110 from which audio data was captured from different users or objects. The one or more audio devices and the image capture device 117 may be directed to different portions of the local area surrounding the client device 110 in various embodiments. For example, the image capture device 117 is directed to an object described by a user, while the controller 210 directs one or more audio capture devices to a region of the local area surrounding the client device 110 from which audio data was captured by a specific user.

The online system 140 and the controller 210 of the client device 110 cooperatively and/or individually maintain and enforce one or more privacy settings for users or people identified from captured video data or other data in various embodiments. A privacy setting of a user or person determines how particular information associated with a user or person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a first user to specify (e.g., by opting out, by not opting in) whether the online system 140 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The online system 140 may access such information in order to provide a particular function or service to the first user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the online system 140.

The privacy settings maintained and enforced by the online system 140 and/or the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 and/or various components client device 110 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example and not by way of limitation, the online system 140 may provide a functionality for a user to provide voice-print recordings to the online social network. As an example, and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the online system 140. As another example and not by way of limitation, the online system 140 may provide a functionality for a user to provide a reference image (e.g., a facial profile) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the system 140. Any of such restrictions on capture biometric and/or other personal data may also be applied to the client device 110.

Users may authorize the capture of data, identification of users, and/or sharing and cross-application use of user-related data in one or more ways. For example, user may pre-select various privacy settings before the users use the features of the client devices 110 and/or take actions in the online system 140. In another case, a selection dialogue may be prompted when users first carry out an action or use a feature of the client devices 110 and/or the online system 140 and/or when users have not carried out the action or used the feature for a predetermined period of time. In yet another example, the client devices 110 and the online system 140 may also provide notifications to the users when certain features that require user data begin to operate or are disabled due to users' selections to allow users to make further selections through the notifications. Other suitable ways for users to make authorizations are also possible.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

Figure 3:
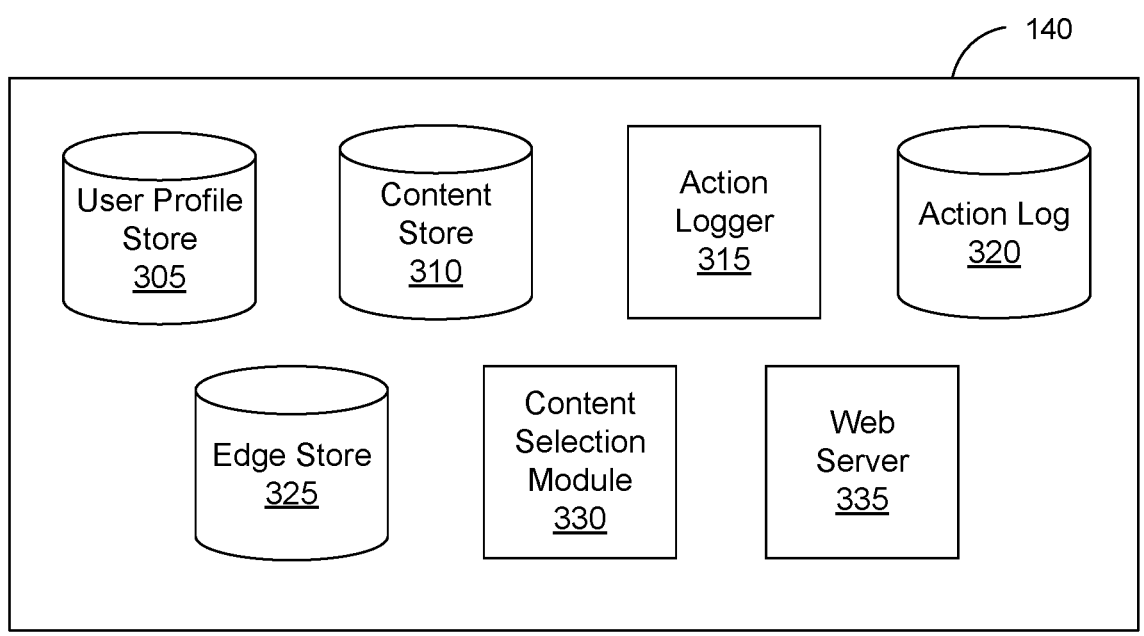
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Based on the privacy settings, the action logger 315 may be authorized to receive communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

Based on the privacy settings, the action log 320 may be authorized by the users to be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140, subject to the privacy settings of the users. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

Based on a user's action or consent, the content selection module 330 receives video data captured by an image capture device 117 included in a client device 110 associated with the user of the online system and transmits the video data to a receiving client device 110 for presentation to a viewing user via a display device 115. The online system 140 may receive a request from the client device 110 that identifies the viewing user, and subsequently provides video data from the client device 110 to the receiving client device 110 in response to receiving an authorization from the viewing user. Conversely, the online system 140 receives a request from the viewing user via the receiving client device 110 and subsequently provides video data received from the client device 110 to the receiving client device 110 in response to receiving an authorization from the user. This allows different users of the online system 140 to exchange video data captured by client devices 110 associated with the users via the online system 140.

Additionally, the content selection module 330 may receive instructions from the viewing user via the receiving client device 110 and transmits one or more of the instructions to the client device 110. Based on the received instruction, the client device 110 modifies video data captured after receiving the instructions or modifies one or more parameters of the image capture device 117 based on the instructions. Hence, the client device 110 modifies captured video data based on the one or more instructions from the receiving client device 110 and transmits the modified video data, or the video data captured by the image capture device 117 using the modified parameters, to the content selection module 330, which transmits the video data to the receiving client device 110. This allows the viewing user to modify or adjust the video data captured by the client device 110 and provided to the viewing user via the receiving client device 110.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Identifying Regions of Captured Video Data Based on Movement

Figure 4:
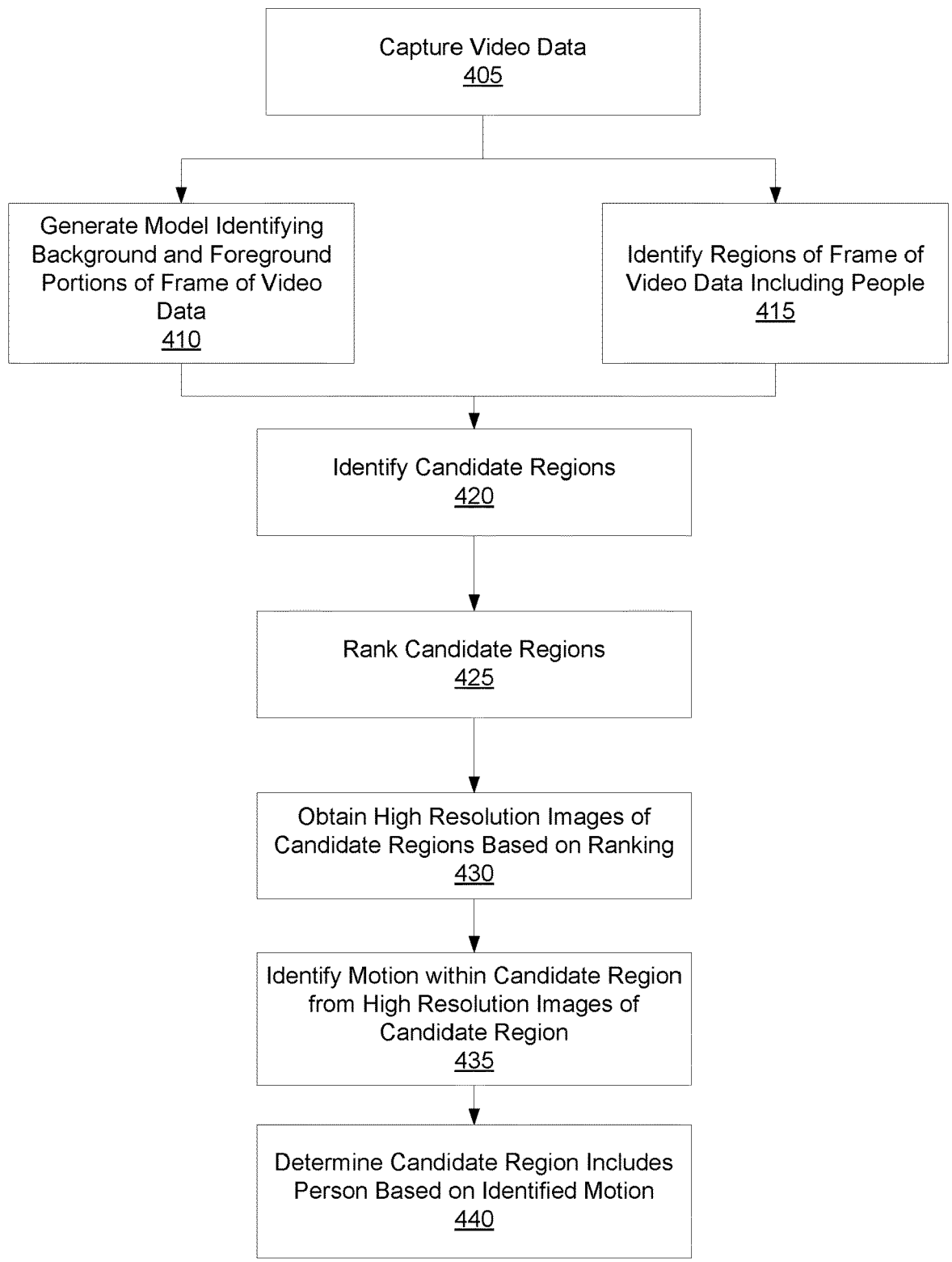
FIG. 4 is a flowchart of a method for identifying regions of interest in captured video data based on movement within regions of the captured video data, in accordance with an embodiment.

FIG. 4 is a flowchart of a method for identifying regions of interest in captured video data based on movement within regions of the captured video data. In various embodiments, the steps described in conjunction with FIG. 4 may be performed in different orders. Additionally, in some embodiments, the method may include different and/or additional steps than those shown in FIG. 4.

A client device 110 includes an image capture device 117, as further described above in conjunction with FIG. 2, that captures 405 video data of a local area surrounding the client device 110. Frames of the video data captured 405 by the image capture device 117 are communicated to a controller 210 included in the sending client device 110A (or coupled to the client device 110 in other embodiments). In various embodiments, a user may authorize (e.g., through preselected privacy settings and/or prompted selections) the controller 210 to apply one or more machine learned models to characteristics of the video captured 405 by the image capture device 117 to locate people included in the captured video data.

To more accurately identify regions of interest of captured video data, such as regions including people or other particular objects, the controller 210 generates 410 a model identifying one or more foreground portions of frames of the captured video data and a background portion of frames of the video data. In various embodiments, the model identifies the background portion of frames of the video data with the model, so regions of the video data that are not identified as the background portion are the one or more foreground portions of the video data. The controller 210 may generate the model based on changes in different regions of the captured video data over time, so regions of the video data having less than a threshold amount of change over at least a threshold number of consecutive pixels are identified as background portions of the captured video data. For example, the generated model identifies the background portion of the captured video data as areas of the captured video data including static objects, while a foreground portion includes a region of the captured video data including moving objects, such as people, or otherwise including pixels having attributes that change at least a threshold amount between consecutive frames of the captured video data. The generated model differentiates between background objects (e.g., furniture, walls, bookshelves, tables, chairs, carpeting, ceilings, chandeliers, and any other object that remains in the environment without moving) in the local area for which the image capture device 117 captures 405 video data and objects, such as people, within the local area that move over time. In various embodiments, the controller 210 generates 410 the model using periodic color and pixel information for consecutive frames in the captured video data to determine portions of the captured video data of the local area that are background and portions of the captured video data of the local area are foreground. If pixels of the captured video data some of the pixels periodically move (e.g., change color or intensity) between consecutive frames of the captured video data, the controller 210 identifies those pixels as a foreground portion of the captured video data. However, if pixels remain unchanged for a threshold period of time or for a threshold number of consecutive frames of the captured video data, the pixels are identified as a background portion of the captured video data.

Hence, the controller 210 generates 410 a model that differentiates a foreground portion of captured video data from a background portion of the video data based on differences in pixels having corresponding locations in consecutive frames of video data. In some embodiments, the generated model labels regions of the captured video data corresponding to pixels in different locations within a frame of the captured video data as a background portion or as a foreground portion. Alternatively, the generated model labels regions of the captured video data corresponding to pixels in different locations within a frame of the captured video data as a background portion, and does not label regions of the captured video data corresponding to foreground portions (or vice versa).

In some embodiments, the controller 210 records color values for pixels associated with background portions of the captured video data and labels the recorded color values for the pixels associated with a background portion as background. The controller 210 may also obtain depth information in various embodiments, so each pixel has a depth value as well as corresponding color values. When generating 410 the model identifying the background portion of the captured video data, the controller 210 may use depth values for different pixels, as pixels with smaller depth values are more likely to be a foreground portion, while pixels with larger depth values are more likely to be a background portion. Additionally, the controller 210 may use changes in depth values for different pixels between frames to identify foreground portions of the captured video data in some embodiments.

In addition to generating 410 the model identifying the background portion of the captured video data, the controller 210 applies one or more additional models to the captured video data to identify 415 one or more regions within frames of video data that include people (or other objects). Application of the one or more additional models allows the controller 210 to identify regions within frames of the captured video data that include people, or other objects, even though the people remain stationary or minimally moving for a time interval. For example, the one or more additional models perform two- or three-dimensional pose tracking, allowing the controller 210 to combine identification of a background portion of captured video data and identification of regions of the captured video data including a person, or other object, based on the pose tracking. In various embodiments, the controller 210 identifies portions of the local area captured 405 by the video data as background portions except for regions within the video data the one or more additional models identify as including a person (or another object) via two- or three-dimensional pose tracking.

In various embodiments, the controller 210 identifies 415 regions within frames of the captured video data that include people by generating a bounding box (e.g., bounding box) that surrounds two- or three-dimensional pose data for each person (or other object). A bounding box may be generated for each person (or other object) identified 415 via two- or three-dimensional pose data. From the model identifying background portions and foreground portions of the captured video data, the controller 210 may differentiate between animate objects (e.g., people, animals) and inanimate objects (e.g., photographs, coat racks, wall art) based on an amount of movement made by each object makes. If the controller 210 determines an object moves more than a threshold amount in consecutive frames of the captured video data, the object is classified as animate, while an object moving less than the threshold amount in consecutive frames of the captured video data is classified as inanimate. In some embodiments, the controller 210 classifies an object determined to be animate as a person when two- or three-dimensional pose data of the object has at least a threshold similarity with two- or three-dimensional pose data of a person.

For example, the controller 210 performs facial tracking (in two-dimensions or in three-dimensions), two-dimensional pose tracking, three-dimensional pose tracking, or any other suitable method to identify portions of a person's face or portions of the person's body. The 210 controller identifies 415 regions of the captured video data including people (or other objects) and stores metadata in association with the video data specifying locations within the captured video data of the identified regions. For example, the controller 210 stores coordinates of frames of the video data specifying a bounding box identified 415 as including a person (or another object}, so the bounding box specifies the region of the captured video data including the person (or the other object).

From the generated model identifying the background portion and the foreground portion of the captured video data and the regions of the captured video data identified 415 as including a person (or another object), the controller 210 identifies 420 candidate regions of frames of the video data as regions of frames of the video data identified as including a person (or another object) that were potentially incorrectly identified as not including a person (or another object) or that were potentially incorrectly identified as including a person. In various embodiments, the controller 210 generates scores for each of multiple regions of frames of the captured video data. For example, a score for a region of a frame identified of the captured video data identified as including a person (or another object) is a ratio of a number of pixels in a bounding box of a region identified as a foreground portion of the video data and identified as including a person to a total number of pixels in a bounding box of the region identified as including the person and as the foreground portion. Regions having at least a threshold score are identified 420 as candidate regions, which the controller 210 further evaluates to determine if the regions include a person. In some embodiments, the controller 210 identifies 420 regions having a score greater than a threshold value and below a maximum value as candidate regions, allowing the controller 210 to avoid further analyzing regions having greater than a threshold likelihood of including a person or another object.

In various embodiments, the controller 210 ranks the candidate regions based on their scores, so candidate regions having higher scores have higher positions in the ranking. In some embodiments, the controller 210 ranks the candidate regions based on one or more criteria. For example, the controller 210 accounts for an amount of time before the generated model would identify the different candidate regions as background portions of the captured video data. In the preceding example, candidate regions that would be identified as background portions of the captured video data in shorter amounts of time have higher positions in the ranking than candidate regions that would be identified as background portions of the captured video data In another example, the controller 210 adjusts scores for different candidate regions based on amounts of time before the generated model would identify corresponding candidate regions as background portions of the video data to increase scores of candidate regions that would be classified as background portions of the captured video data in shorter amounts of time. In other embodiments, the controller 210 adjusts scores for different candidate regions based on whether a pose or a face was identified within the candidate region, increasing scores of candidate regions in which a pose or a face was identified, and ranks 425 the candidate regions based on the adjusted scores. In other embodiments, the controller 210 adjusts scores for candidate regions based on combinations of whether poses or faces were identified in candidate regions, amounts of time until candidate regions would be identified as background portions of the captured video data, as well as any other suitable information to rank 425 the candidate regions.

The controller 210 obtains 430 higher resolution frames of one or more candidate regions from an image capture device. For example, the controller 210 selects candidate regions having at least a threshold position in the ranking and identifies coordinates within the frames of the captured video of the one or more candidate regions to the image capture device 117 along with an instruction to capture higher resolution frames of the coordinates corresponding to the one or more candidate regions. This increases a resolution at which the image capture device 117 subsequently captures frames of video data of a selected candidate region. The image capture device 117 provides the higher resolution image of the one or more candidate regions to the controller 210 through a separate channel than the image capture device 210 uses to provide other captured frames of video data to the controller 210. This allows the controller 210 to obtain higher resolution frames of the candidate regions from the image capture device 117, while the image device 117 also captures capturing lower resolution frames of a wider portion of the local area surrounding the client device 110 that are provided to the controller 210 for communication to a display device 115 or to another client device 210. By ranking the candidate regions, the controller 210 to prioritize different candidate regions for which higher resolution frames are obtained 430, allowing the controller 210 to more efficiently allocate computational resources for analysis of certain higher resolution frames, as further described below. This allows the controller 210 to optimize limited computational resources by allocating available computational resources to a limited number of candidate regions that are selected from the ranking.

The controller 210 applies one or more models to identify motion in the higher resolution frames of a candidate region of the captured video data and determines 440 whether the candidate region includes a person (or another object) based on the amount of motion identified in the higher resolution frames of the candidate region. For example, the controller 210 determines a number of pixels within higher resolution frames of the candidate region that change during a specific period of time, indicating movement, and determines 440 the candidate region includes a person if the determined number of pixels in the higher resolution frames of the candidate region during the specific period of time equal or exceed a threshold value. To identify motion in the higher resolution frames of the candidate region of the captured video data, the controller 210 applies a different model than the previously generated 410 model identifying the background portion of the captured video data, so the model applied to the higher resolution frames of the candidate uses a different threshold number of pixels indicating movement than an alternative threshold number of pixels changing between consecutive frames of the captured video data within regions of the captured video data used by the controller 210 to identify background portions of the captured video data. In response to identifying at least a threshold amount of motion in the higher resolution frames of the candidate region, the controller 210 determines 440 the candidate region includes a person (or another object) and identifies the candidate region as including a person (or another object). For example, the controller 210 stores a label in association with coordinates specifying a bounding box within frames of the video data that correspond to the candidate region indicating the candidate region includes a person (or another object). However, in response to identifying less than the threshold amount of motion in the higher resolution frames of the candidate region, the controller 210 determines 440 the candidate region does not include a person (or another object) and stores label in association with coordinates specifying a bounding box within frames of the video data that correspond to the candidate region indicating the candidate region does not includes a person (or another object) or that identifies the candidate region as a background portion.

Hence, the controller 210 uses a two-stage process that initially identifies candidate regions to further evaluate for including a person from captured video data of a scene and subsequently obtains higher resolution frames of different candidate regions. The higher resolution frames of a candidate region are subsequently used to determine whether the candidate region includes a person (or another object) or is a background portion of the captured video data. This allows the controller 210 to be more sensitive to smaller amounts of motion in a candidate region of the captured video data from the higher resolution frames of the candidate region, allowing more accurate differentiation of people (or other objects) from inanimate objects, such as pictures or portraits. Improved accuracy in distinguishing people (or moving objects) from inanimate objects that appear similar to people allows the controller 210 to better modify captured video data to track or to otherwise identify people within the captured video data. Additionally, this two-stage process reduces an amount of time for the controller 210 to generate the model identifying the background portion of the captured video data.

In some embodiments, the controller 210 subsequently gathers and updates data for background portions of the captured video data other than regions of the captured video data identified as including people (or other objects). Hence, the controller 210 may update information about background portions of the captured video data over time, while using previously captured data or non-uniform values (i.e., static) for pixels of backgrounds of regions of the captured video data identified as including a person (or another object). For RGB images, non-uniform pixels comprise non-uniform red, green, blue values; for example, adjacent pixels have RGB values of either (0, 50, 150), (0, 50, 150) or (50, 50, 50), (100, 100, 100). In other embodiments, the color space may be grayscale, HSV, or any other suitable color space. Each pixel of the captured video data corresponds to a particular location within the local area of which video data was captured 405 and each pixel of the captured video data has a position in a coordinate system that is different from positions of other pixels. For example, a pixel in a bottom-left corner of a frame of the captured video data has a coordinate pair of (0,0), representing a horizontal and a vertical position within the frame. Each pixel may also have a particular color value, such as a RGB color value.

The controller 210 may subsequently modify the captured video data to more prominently present located people and transmit the modified video data to the online system 140 in various embodiments. A located user is more prominently presented by being presented in the modified video data with at least a threshold set of dimensions (e.g., with at least a threshold height or a threshold width), being presented in at least a threshold amount of a field of view of the image capture device 117 or in at least a threshold amount of a frame of the modified video data, or being presented in one or more specific locations within the modified video data. For example, the controller 210 crops the captured video data to remove portions of the video data that do not include at least one person. As another example, the controller 210 increases a zoom (also referred to as a magnification) of a portion of the video data including a person. To modify the captured video data, the controller 210 may modify video data after being captured by the image capture device 117 or may modify one or more parameters of the image capture device 117 to modify how the image capture device 117 captures 405 video data.

Figure 5:
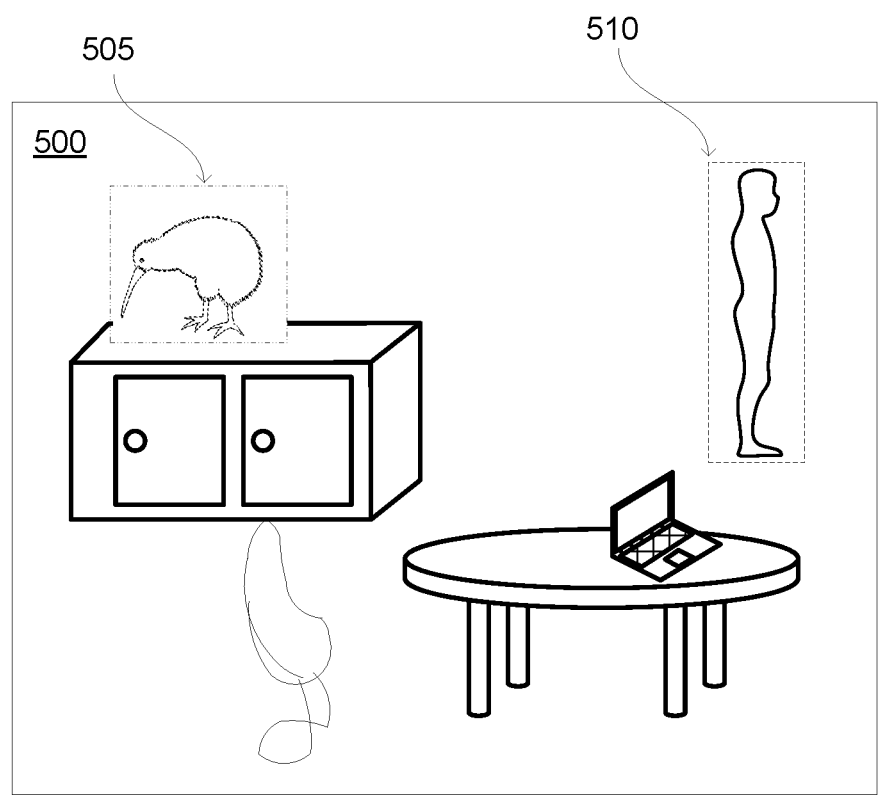
FIG. 5 is an example of identifying regions of interest in captured video data based on movement within the regions of the captured video data, in accordance with an embodiment.

FIG. 5 is an example of identifying regions of interest in video data captured by an image capture device 117 of a client device 110 based on movement within the regions of the captured video data. In the example of FIG. 5, a frame 500 of the captured video data is shown for purposes of illustration. As further described above in conjunction with FIG. 4, the client device 110 applies one or more models to the captured video data to identify a background portion of the frame 500 and one or more foreground portions of the frame 500. In the example of FIG. 5, application of the one or more models identifies region 505 and region 510 as foreground portions of the frame 500 and identifies the remainder of the frame 500 as the background portion. In various embodiments, the client device 110 identifies region 505 and region 510 as foreground portions because region 505 and region 510 include at least a threshold amount of pixels having attributes that change at least a threshold amount between fame 500 and a consecutive earlier frame of the captured video data. Other than region 505 and region 510, the remaining portion of the frame 500 does not include at least the threshold amount of pixels that change at least the threshold amount between the frame 500 and an earlier consecutive frame. In various embodiments, the client device 110 generates a bounding box including region 505 and a bounding box including region 510 and stores a label in association with each bounding box indicating that the bounding box includes a foreground portion of the frame 500.

As further described above in conjunction with FIG. 4, the client device 110 also applies one or more additional models to the captured video data to identify one or more regions within the frame 500 including people or other objects. For example, the one or more additional models perform two- or three-dimensional pose tracking, allowing the client device 110 to both identify background and foreground portions of the frame, while also identifying regions of the frame 500 including a person or other object based on pose tracking. In the example of FIG. 5, the client device 110 determines that region 505 and region 510 each include an object, such as a person, and identifies the bounding box generated for region 505 and the bounding box generated for region 510 as including an object.

The client device 110 identifies candidate regions of the frame 500 from the background portion and the foreground portions of the captured video data and the regions of the captured video data identified as including an object. In the example of FIG. 5, the client device 110 identifies region 510 as a candidate region, but does not identify region 505 as a candidate region. For example, the client device 110 determines that region 510 has a threshold score based on a ratio of a number of pixels in the bounding box including region 510 identified as foreground portions of the video data to a total number of pixels in the bounding box of the region 510, but determines that region 505 has less than the threshold score. As further described above in conjunction with FIG. 4, the client device 110 subsequently obtains higher resolution frames of region 510 via the image capture device 117. For example, the client device 110 identifies coordinates within the frames of the captured video of the region 510. This allows the client device 110 to obtain higher resolution frames of the candidate regions, region 510, also capturing relatively lower resolution frames of a wider portion of the local area.

As further described above in conjunction with FIG. 4, the client device 110 applies one or more models to identify motion in the higher resolution frames of region 510 of the captured video data and determines whether the candidate region includes an object, such as a person, based on the amount of motion identified in the higher resolution frames of region 510. For example, the client device 110 determines a number of pixels within higher resolution frames of region 510 that change during a specific period of time, indicating movement, and determines region 510 includes a person if the determined number of pixels in the higher resolution frames of the region 510 during the specific period of time equal or exceed a threshold value. To identify motion in the higher resolution frames of region 510 of the captured video data, the client device 110 applies a different model than the model previously used to identify background portion and foreground portions of the captured video data; for example, the different model uses a different threshold number of pixels indicating movement than the threshold used to identify foreground or background portions of the video data. In response to identifying at least a threshold amount of motion in the higher resolution frames of region 510, the client device 110 stores a label in association with the coordinates of the bounding box including region 510 as including an object (e.g., a person).

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    capturing video data of a local area within a field of view of an image capture device included in a client device, the captured video data comprising a plurality of frames;
    identifying a background portion and one or more foreground portions of frames of the captured video data, the foreground portions including at least a threshold amount of movement in consecutive frames of the captured video data;
    identifying one or more regions within the captured video data including an object;
    identifying a candidate region from the identified one or more regions based on amounts of each of the identified one or more regions identified as foreground portions of frames of the captured video data;
    capturing higher resolution frames of the candidate region via the image capture device included in the client device, while maintaining capture of the video data of the local area;
    determining an amount of movement within the candidate region between consecutive frames of the higher resolution frames of the candidate region; and
    identifying the candidate region includes a moving object in response to the amount of movement within the candidate region between consecutive frames of the higher resolution frames of the candidate region equaling or exceeding a different threshold amount of movement.

2. The method of claim 1, wherein identifying the candidate region from the identified one or more regions based on amounts of each of the identified one or more regions identified as foreground portions of frames of the captured video data comprises:
    identifying the candidate region as an identified region having at least a threshold ratio of a number of pixels in the identified region as foreground portions of the captured video data to a total number of pixels in the identified region.

3. The method of claim 1, wherein identifying the candidate region from the identified one or more regions based on amounts of each of the identified one or more regions identified as foreground portions of frames of the captured video data comprises:
    determining a score for each of the identified one or more regions, a score for an identified region based on a ratio of a number of pixels in an identified region as foreground portions of the captured video data to a total number of pixels in the identified region; and
    identifying the candidate region as an identified region having a score greater than a threshold value and less than a maximum value.

4. The method of claim 3, wherein determining the score for each of the identified one or more regions comprises:
    adjusting the score for the identified region based on an amount of time for a model applied by the client device to classify the identified region as the background portion of the captured video data, so the score for the identified region is increased in response to a smaller amount of time for the model applied by the client device to classify the identified region as the background portion of the captured video data.

5. The method of claim 3, wherein determining the score for each of the identified one or more regions comprises:
    increasing the score for the identified region in response to identifying a pose or a face in the identified region.

6. The method of claim 1, wherein identifying the candidate region from the identified one or more regions based on amounts of each of the identified one or more regions identified as foreground portions of frames of the captured video data comprises:

determining a score for each of the identified one or more regions, a score for an identified region based on a ratio of a number of pixels in an identified region as foreground portions of the captured video data to a total number of pixels in the identified region;
ranking the identified regions based on their scores; and
identifying the candidate region as an identified region having at least a threshold position in the ranking.

7. The method of claim 1, wherein capturing higher resolution frames of the candidate region via the image capture device included in the client device comprises:
identifying coordinates within the frames of the captured video of the candidate region; and
capturing higher resolution frames of the identified coordinates of the candidate region through a separate channel from the image capture device than a channel of the image capture device capturing the video data of the local area.

8. The method of claim 1, wherein determining the amount of movement within the candidate region between consecutive frames of the higher resolution frames of the candidate region comprises:
determining a number of pixels within the higher resolution frames of the candidate region that change during a specific period of time.

9. The method of claim 8, wherein identifying the candidate region includes the moving object in response to the amount of movement within the candidate region between consecutive frames of the higher resolution frames of the candidate region equaling or exceeding the different threshold amount of movement comprises:
identifying the candidate region includes the moving object in response to the number of pixels within the higher resolution frames of the candidate region that change during the specific period of time equals or exceed a threshold value.

10. The method of claim 1, wherein identifying the candidate region includes the moving object in response to the amount of movement within the candidate region between consecutive frames of the higher resolution frames of the candidate region equaling or exceeding the different threshold amount of movement comprises
storing a label indicating the candidate region includes the moving object in association with coordinates specifying a bounding box corresponding to the candidate region.

11. The method of claim 1, further comprising:
identifying the candidate region does not include the moving object in response to the amount of movement within the candidate region between consecutive frames of the higher resolution frames of the candidate region being less than the different threshold amount of movement.

12. A computer program product comprising a non-transitory computer-readable storage medium having instructions encoded thereon that, when executed by a processor, cause the processor to:
capture video data of a local area within a field of view of an image capture device included in a client device, the captured video data comprising a plurality of frames;
identify a background portion and one or more foreground portions of frames of the captured video data;
identify one or more regions within the captured video data including at least a threshold amount of movement in consecutive frames of the captured video data;
identify a candidate region from the identified one or more regions based on amounts of each of the identified one or more regions identified as foreground portions of frames of the captured video data;
capture higher resolution frames of the candidate region via the image capture device included in the client device, while maintaining capture of the video data of the local area;
determine an amount of movement within the candidate region between consecutive frames of the higher resolution frames of the candidate region; and
identify the candidate region includes a moving object in response to the amount of movement within the candidate region between consecutive frames of the higher resolution frames of the candidate region equaling or exceeding a different threshold amount of movement.

13. The computer program product of claim 12, wherein identify the candidate region from the identified one or more regions based on amounts of each of the identified one or more regions identified as foreground portions of frames of the captured video data comprises:
identify the candidate region as an identified region having at least a threshold ratio of a number of pixels in the identified region as foreground portions of the captured video data to a total number of pixels in the identified region.

14. The computer program product of claim 12, wherein identify the candidate region from the identified one or more regions based on amounts of each of the identified one or more regions identified as foreground portions of frames of the captured video data comprises:
determine a score for each of the identified one or more regions, a score for an identified region based on a ratio of a number of pixels in an identified region as foreground portions of the captured video data to a total number of pixels in the identified region; and
identify the candidate region as an identified region having a score greater than a threshold value and less than a maximum value.

15. The computer program product of claim 14, wherein determining the score for each of the identified one or more regions comprises:
adjust the score for the identified region based on an amount of time for a model applied by the client device to classify the identified region as the background portion of the captured video data, so the score for the identified region is increased in response to a smaller amount of time for the model applied by the client device to classify the identified region as the background portion of the captured video data.

16. The computer program product of claim 14, wherein determine the score for each of the identified one or more regions comprises:
increase the score for the identified region in response to identifying a pose or a face in the identified region.

17. The computer program product of claim 12, wherein identify the candidate region from the identified one or more regions based on amounts of each of the identified one or more regions identified as foreground portions of frames of the captured video data comprises:
determine a score for each of the identified one or more regions, a score for an identified region based on a ratio of a number of pixels in an identified region as foreground portions of the captured video data to a total number of pixels in the identified region;
rank the identified regions based on their scores; and
identify the candidate region as an identified region having at least a threshold position in the ranking.

18. The computer program product of claim 12, wherein capture higher resolution frames of the candidate region via the image capture device included in the client device comprises:
- identify coordinates within the frames of the captured video of the candidate region; and
- capture higher resolution frames of the identified coordinates of the candidate region through a separate channel from the image capture device than a channel of the image capture device capturing the video data of the local area.

19. The computer program product of claim 12, wherein determine the amount of movement within the candidate region between consecutive frames of the higher resolution frames of the candidate region comprises:
- determine a number of pixels within the higher resolution frames of the candidate region that change during a specific period of time.

20. The computer program product of claim 12, wherein identify the candidate region includes the moving object in response to the amount of movement within the candidate region between consecutive frames of the higher resolution frames of the candidate region equaling or exceeding the different threshold amount of movement comprises:
- identify the candidate region includes the moving object in response to the number of pixels within the higher resolution frames of the candidate region that change during the specific period of time equals or exceed a threshold value.

21. The computer program product of claim 12, wherein identify the candidate region includes the moving object in response to the amount of movement within the candidate region between consecutive frames of the higher resolution frames of the candidate region equaling or exceeding the different threshold amount of movement comprises
- store a label indicating the candidate region includes the moving object in association with coordinates specifying a bounding box corresponding to the candidate region.

* * * * *